(12) United States Patent
Clemmer et al.

(10) Patent No.: US 12,420,852 B2
(45) Date of Patent: Sep. 23, 2025

(54) FOLDABLE STROLLER WAGON

(71) Applicant: Wonderland Switzerland AG, Steinhausen (CH)

(72) Inventors: Lance J. Clemmer, Mohnton, PA (US); Patrick J. G. Bowers, West Chester, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 331 days.

(21) Appl. No.: 18/010,934

(22) PCT Filed: Jun. 17, 2021

(86) PCT No.: PCT/US2021/037820
§ 371 (c)(1),
(2) Date: Dec. 16, 2022

(87) PCT Pub. No.: WO2021/257824
PCT Pub. Date: Dec. 23, 2021

(65) Prior Publication Data
US 2023/0242168 A1 Aug. 3, 2023

Related U.S. Application Data

(60) Provisional application No. 63/041,194, filed on Jun. 19, 2020.

(51) Int. Cl.
*B62B 3/02* (2006.01)
*B62B 3/00* (2006.01)
*B62B 5/06* (2006.01)

(52) U.S. Cl.
CPC .............. *B62B 3/025* (2013.01); *B62B 3/007* (2013.01); *B62B 5/067* (2013.01)

(58) Field of Classification Search
CPC .......... B62B 3/025; B62B 3/007; B62B 5/067
See application file for complete search history.

(56) References Cited

U.S. PATENT DOCUMENTS

| 6,155,902 | A | 12/2000 | Kole, Jr. et al. |
| 7,594,667 | B2 * | 9/2009 | Overland ................. A45C 3/04 16/110.1 |
| 9,145,154 | B1 | 9/2015 | Horowitz |

(Continued)

FOREIGN PATENT DOCUMENTS

| KR | 20160093868 A | 8/2016 |
| TW | M510268 U | 10/2015 |

OTHER PUBLICATIONS

International Search Report and Written Opinion for Application No. PCT/US2021/037820 dated Sep. 24, 2021.

(Continued)

*Primary Examiner* — Bryan A Evans
(74) *Attorney, Agent, or Firm* — Volpe Koenig

(57) ABSTRACT

A foldable wagon assembly is disclosed herein including multiple features. In one aspect, a push handle is provided that includes pivoting connections located inward from a longitudinally outermost edge of a frame of the wagon. In another aspect, an upper end of the frame includes at least one slot for securely attaching a soft goods enclosure to the wagon. A pull handle is also provided that can be securely attached in a generally upright position via a retention clip formed on the frame of the wagon.

20 Claims, 15 Drawing Sheets

(56) References Cited

U.S. PATENT DOCUMENTS

| | | | |
|---|---|---|---|
| 9,365,225 B2 * | 6/2016 | Henao | B62B 3/002 |
| 10,988,153 B1 * | 4/2021 | Horowitz | B62B 7/008 |
| 11,214,289 B2 * | 1/2022 | Sun | B62B 1/12 |
| 11,767,046 B2 * | 9/2023 | Kontuniemi | B62B 3/022 |
| | | | 280/639 |
| 2007/0222167 A1 | 9/2007 | Pike et al. | |
| 2015/0035258 A1 * | 2/2015 | Chen | B62B 3/007 |
| | | | 280/651 |
| 2018/0057035 A1 | 3/2018 | Choi | |
| 2019/0328093 A1 * | 10/2019 | Newman | A45C 9/00 |
| 2020/0031376 A1 | 1/2020 | Horowitz | |
| 2020/0353963 A1 | 11/2020 | Kramer | |

OTHER PUBLICATIONS

Office Action issued in counterpart TW Application No. 110122452 on May 20, 2022.
Jeep Wrangler Stroller Wagon Instruction Manual (Copyright 2019).
Beau Jardin Folding Wagon (2020).
"Partial Supplementary European Search Report Issued in Corresponding European Patent Application No. 21826465.3", Mailed Date: Jul. 10, 2024, 12 pages.

\* cited by examiner

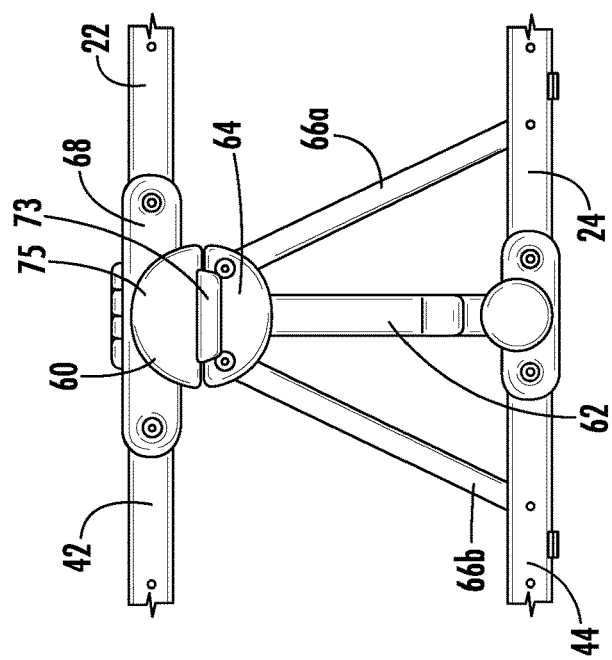
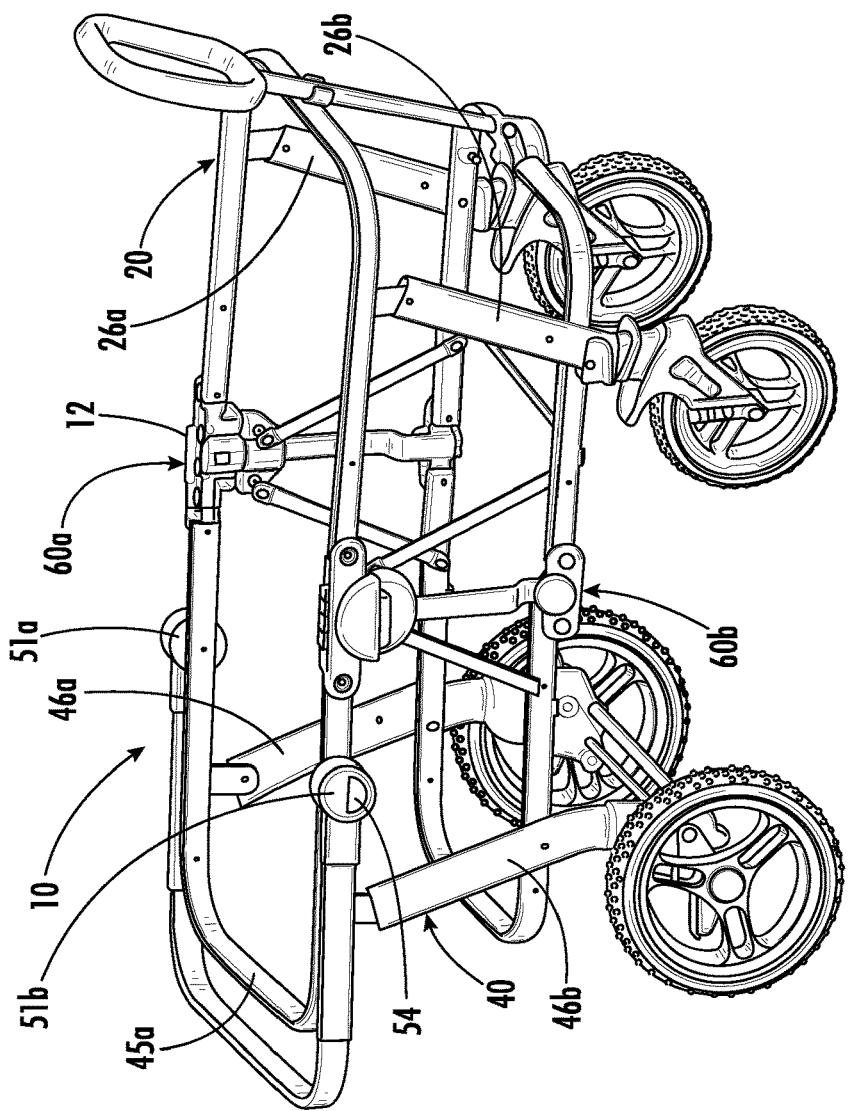
FIG. 5B
FIG. 5A

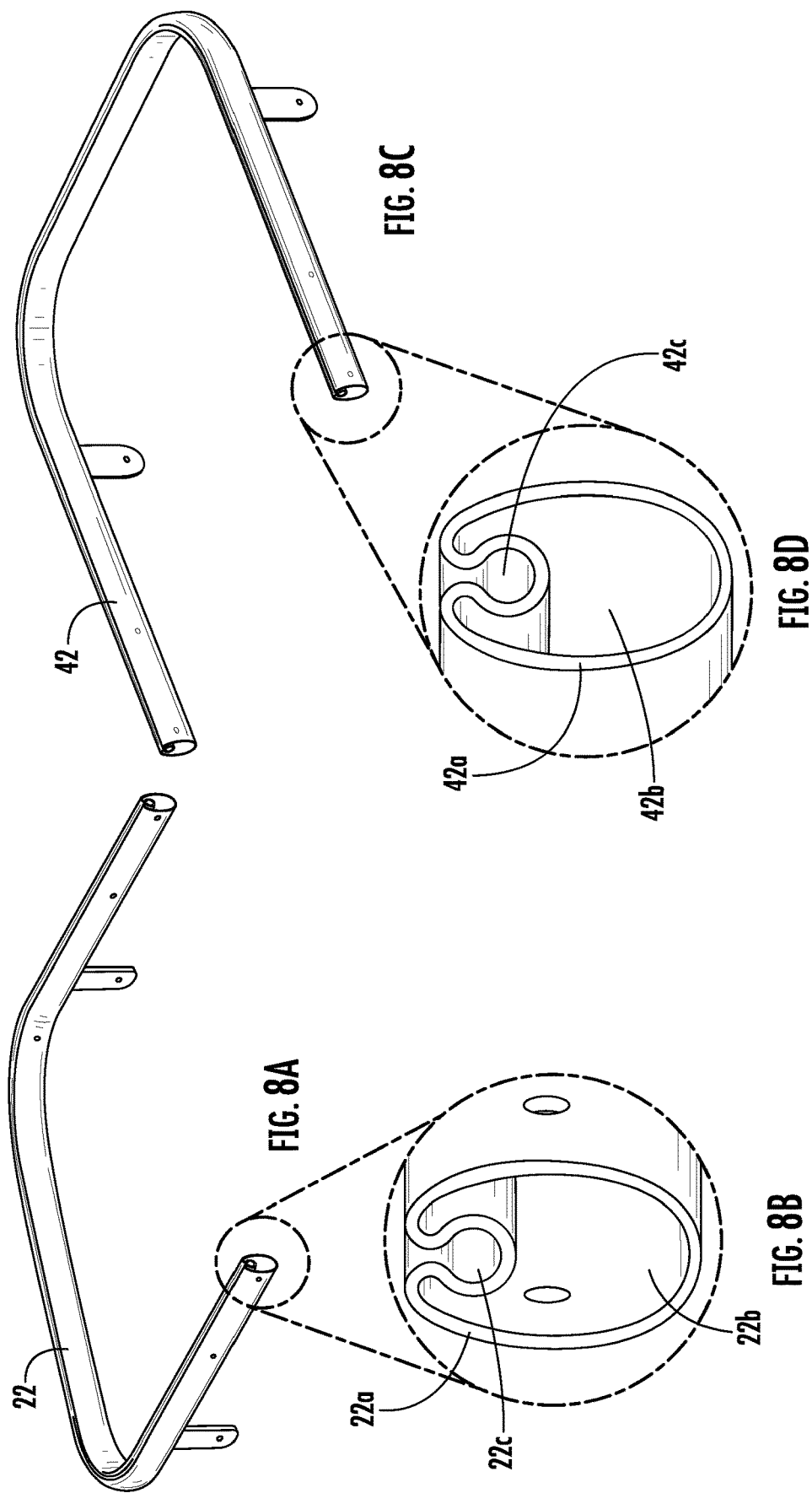

FOLDABLE STROLLER WAGON

CROSS-REFERENCE TO RELATED APPLICATION

This application is a 371 National Stage filing of International Application No. PCT/US2021/037820, filed Jun. 17, 2021, which claims priority to U.S. Provisional Application No. 63/041,194, filed Jun. 19, 2020, the disclosures of which are hereby incorporated by reference as if set forth in their entirety herein.

TECHNICAL FIELD

The present disclosure is generally directed to a foldable stroller wagon.

BACKGROUND

There are several stroller wagons in the market which offer both pushing and pulling modes of maneuverability for the caregiver. Currently, stroller wagons which offer both modes of maneuverability do not offer ways to compactly store either a push handle or a pull handle when the handles are not in use. As a result, the handles are left to hang or lay on the ground, thus increasing the footprint of the stroller wagon.

Stroller wagons with soft goods attachments are well known. The soft goods attachments typically must wrap around the wagon frame, and require some type of fastener or attachment means to secure the soft goods attachment. This can result in an untidy or bulky appearance which is unappealing to consumers that desire a streamlined and modern-looking product. Additionally, some attachment configurations for soft goods enclosures require hook and loop type fasteners, which can accumulate dirt or debris via exposure to the environment or otherwise degrade over time.

Accordingly, it would be desirable to provide a foldable wagon stroller that both addresses storage of the push and/or pull handles, and also provides a sleek appearance with respect to securing the soft goods attachment to the wagon frame.

SUMMARY

In one aspect, the present disclosure provides a wagon assembly including a frame having: a first end and a second end that are spaced from one another along a longitudinal direction; a first side and a second side that are spaced from one another along a lateral direction; and an upper end and a lower end spaced from one another along a vertical direction. The frame defines a receiving area configured to support a child, children, and/or personal items therein. A handle can be pivotally attached to the frame at a pair of pivot connections that are spaced from one another with respect to the lateral direction. The handle is configured to pivot between: a stowed position in which the handle nests relative to at least one portion of the frame, and a deployed position in which the handle extends upwards from the frame.

In another aspect, the foldable wagon assembly can include a front frame and a rear frame. At least one center hinge can connect the front frame and the rear frame. The wagon assembly includes a push handle that is configured to be raised and lowered relative to the rear frame. The push handle can be a telescoping handle which can be lengthened or shortened. In a lower position, the push handle nests around the rear frame and extends parallel to a portion of the rear frame. This aspect minimizes the overall size of the wagon assembly. In another aspect, the wagon assembly includes pivoting connections for the push handle that are located inward from an outermost end of the rear frame.

At least one portion of the frame of the wagon assembly includes at least one slot configured to receive and retain a portion of a soft goods assembly. This aspect provides a simple, secure, and sleek arrangement for attaching a soft goods assembly to the wagon assembly.

Additional embodiments are described below and in the claims.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 5A is a perspective view of the stroller wagon frame in an assembled state according to one example.

FIG. 5B is a magnified view of one center hinge assembly in an assembled state according to one example.

FIG. 8A is perspective view of a front top rail tube according to one example.

FIG. 8B is a magnified portion of FIG. 8A showing features of the front top rail tube.

FIG. 8C is perspective view of a rear top rail tube according to one example.

FIG. 8D is a magnified portion of FIG. 8C showing features of the rear top rail tube.

DETAILED DESCRIPTION

Figure 1:
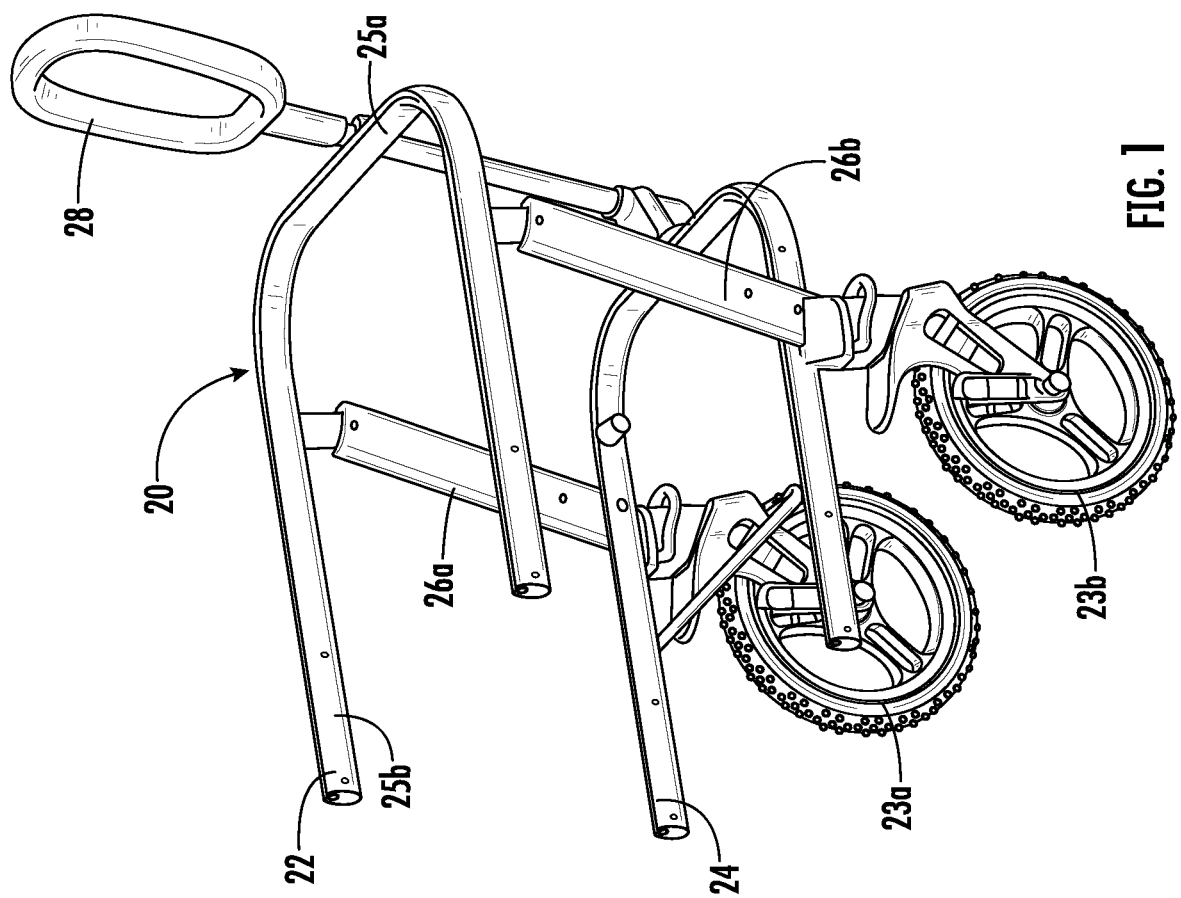
FIG. 1 is a perspective view of a front frame portion of a stroller wagon frame according to one example.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. A reference to a list of items that are cited as "at least one of a, b, or c" (where a, b, and c represent the items being listed) means any single one of the items a, b, or c, or combinations thereof. This terminology includes the words specifically noted above, derivatives thereof and words of similar import. As used herein, the term longitudinally or longitudinal refers to the X1-X2 direction in FIG. 5A, the term laterally refers to the Z1-Z2 direction in FIG. 5A, and the term vertically refers to the Y1-Y2 direction in FIG. 5A.

A stroller wagon frame 10, which is also generally referred to as a frame 10 herein, is disclosed and is shown fully assembled in FIG. 5A. The stroller wagon frame 10 can have a first end, which can be either a front end or rear end, and a second end, which is opposite from the first end and can also be a front end or rear end, that are spaced from one another along the longitudinal direction. In one aspect, the first end is a rear longitudinal end, and the second end is a front longitudinal end, or vice versa. The first end can refer to any portion of the frame 10 on the rear longitudinal end, and the second end can refer to any portion of the frame 10 on the front longitudinal end, or vice versa.

The stroller wagon frame 10 can also include a first side and a second side that are spaced from one another along the lateral direction. In one aspect, the first side is a right or left lateral side, and the second side is the opposite one of the right or left lateral side, or vice versa. The first side can refer to any portion of the frame 10 on the right or left lateral side, and the second side can refer to any portion of the frame on the right or left lateral side, or vice versa.

The stroller wagon frame 10 can also include an upper end and a lower end spaced from one another along the vertical direction. In one aspect, the upper end can include top rail tubes 22, 42 and the lower end can include bottom rail tubes 24, 44.

The frame defines an interior receiving area configured to receive at least one of a child, children, or personal items therein. A soft goods assembly, which is described in more detail herein, is configured to be arranged within the interior receiving area and define a support area configured to support the child, children, or personal items.

Certain portions of the stroller wagon frame 10 are defined as including frame elements, tubes, or other structures. One of ordinary skill in the art would understand that any portion of the frame 10, including the base or bottom portion, side portions, etc., can include rigid planar surfaces and may not comprise tubes with openings defined therebetween.

In another aspect, the stroller wagon frame 10 generally includes a front frame 20, a rear frame 40, and at least one center hinge 60. The at least one center hinge 60 can include a pair of center hinges 60a, 60b, which are mirror images of one another. In some aspects, the center hinge 60 can be omitted and the stroller wagon frame 10 may be configured such that it is not foldable. In yet another aspect, the stroller wagon frame 10 may be foldable, but may rely on an alternative configuration or arrangement that does not include the center hinge 60.

In one aspect, the front frame 20 includes at least one front wheel assembly 23a, 23b, and the rear frame 40 includes at least one rear wheel assembly 43a, 43b. The front wheel assembly 23a, 23b and the rear wheel assembly 43a, 43b can each include a pair of wheels. Alternatively, the stroller wagon frame 10 may include less than four wheels. The term wheel assembly as used herein refers to the entire wheel supporting component, such as any braking component, bearings, casters, axles, etc.

As used herein, the term tube is used for multiple aspects of the frames 20, 40. One of ordinary skill in the art would understand that any type of support structure, such as a rod, cylinder, linkage, or other component can be used. The tubes can be formed as solid components or with hollow interiors.

Figure 4:
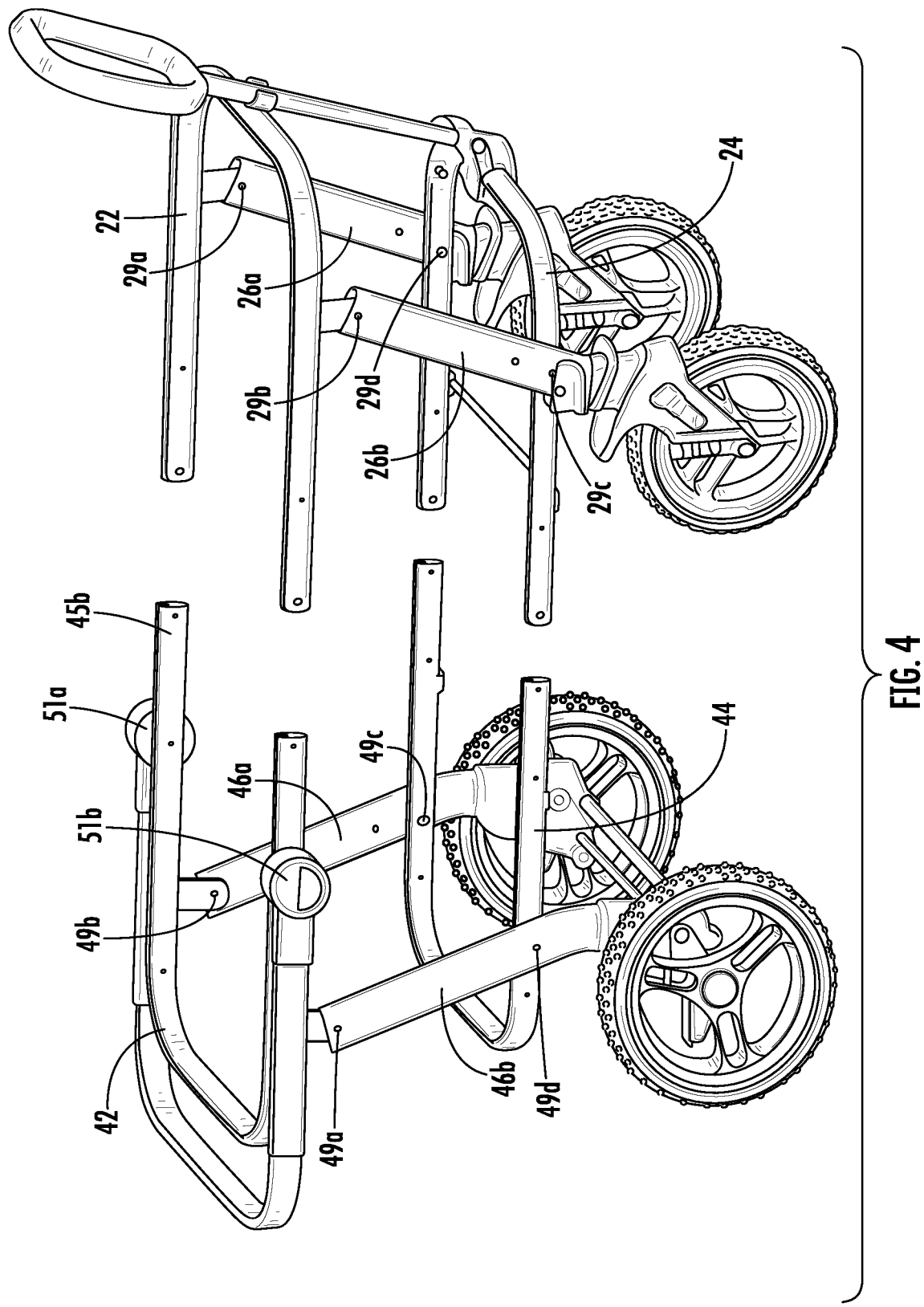
FIG. 4 is a perspective view of the front frame portion and the rear frame portion of the stroller wagon frame prior to assembly and according to one example.

As shown in FIGS. 1 and 4, the front frame 20 can comprise a front top rail tube 22, a front bottom rail tube 24, and front leg tubes or supports 26a, 26b. In one aspect, the front top rail tube 22 has a U-shaped profile. In one aspect, the front bottom rail tube 24 has a U-shaped profile. One of ordinary skill in the art would understand that the shape, profile, and configuration of the front top rail tube 22 and the front bottom rail tube 24 can vary. In certain aspects, the front frame 20 can consist of a plurality of tubes connected at right angles or other angles. The front frame 20 could alternatively include a series of linkages, plates, rods, tubes, or other structures that are connected to each other in an intersecting manner, similar to a scissor lift support frame, such that the front frame 20 can be folded. In one aspect, a bottom portion of the front frame 20 can include at least one rigid support surface. The bottom portion may include a solid support surface. In another aspect, a grid or lattice type support surface can be provided by the bottom portion. One of ordinary skill in the art would understand that any side or bottom portion of the front frame 20 can include a rigid surface.

As shown in FIG. 4, the front leg tubes 26a, 26b can connect the front top rail tube 22 and the front bottom rail tube 24 through pivot connections 29a, 29b, 29c, 29d. Terminal ends of the front leg tubes 26a, 26b can connect to the front wheel assemblies 23a, 23b. One of ordinary skill in the art would understand that alternative configurations could be used to connect the upper and lower ends of the front frame 20 instead of the front leg tubes 26a, 26b. Additionally, the front wheel assemblies 23a, 23b could be connected directly to another portion of the frame 10.

Figure 7A:
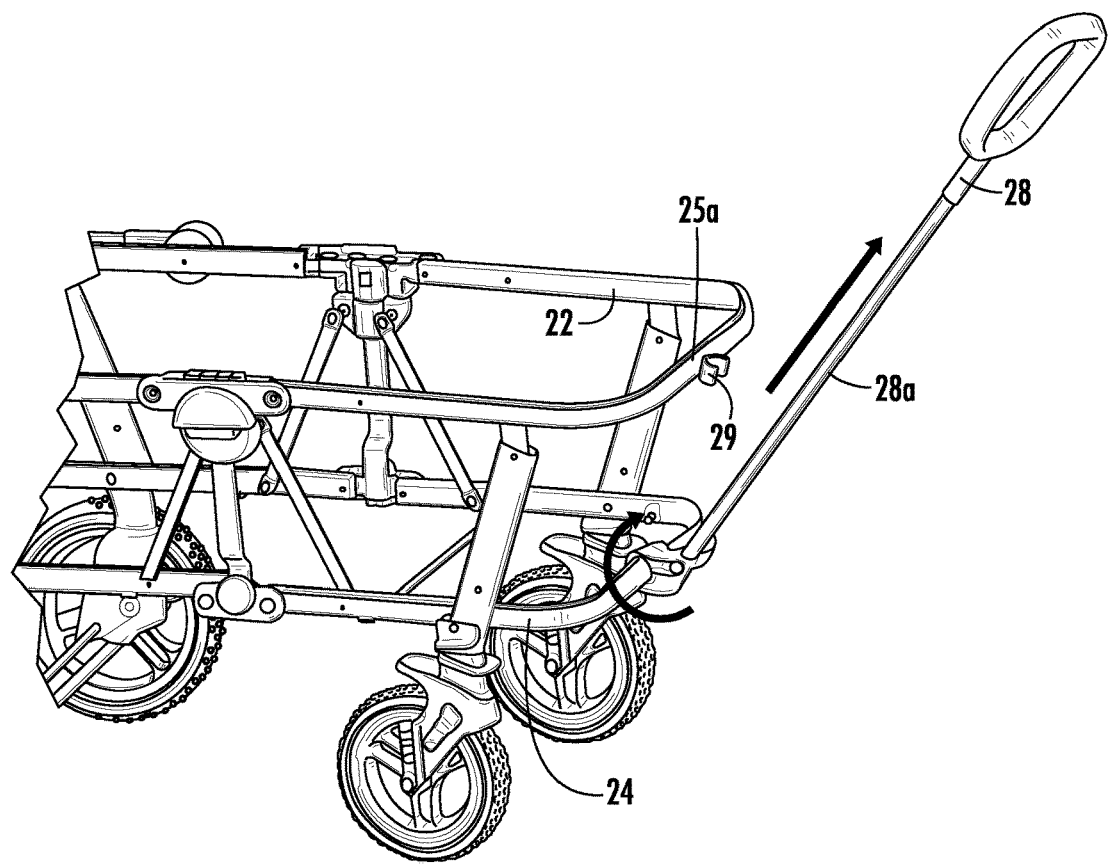
FIGS. 7A and 7B illustrate perspective views of the front frame portion with a pull handle in two different positions and configurations.
Figure 7B:
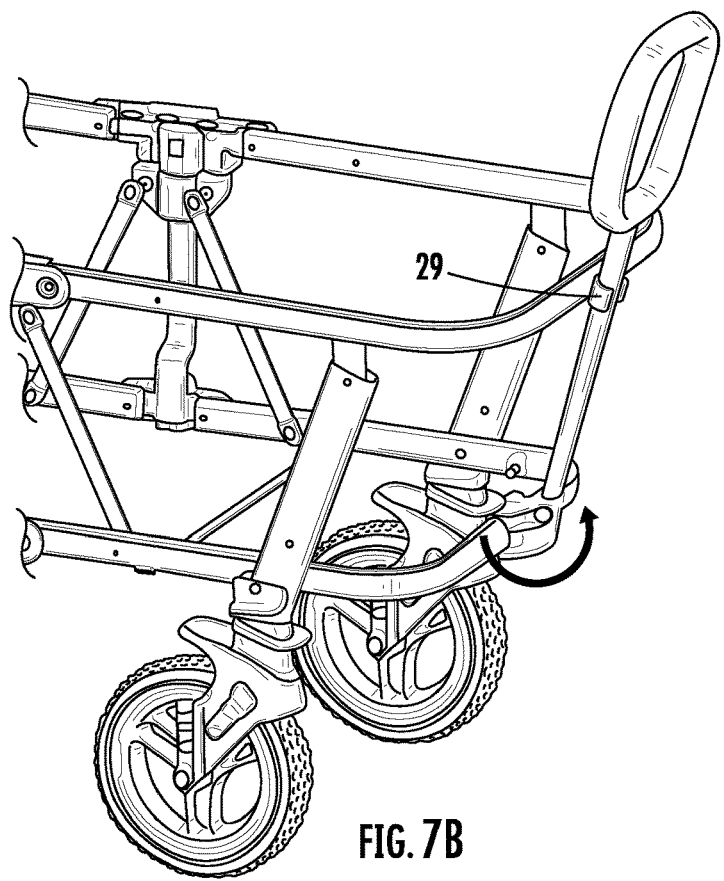

In one aspect, a first handle 28 is provided, as shown by at least FIGS. 1, 7A and 7B. The first handle 28 can be a pull handle or front handle that is generally connected to at least one portion of the frame 10. In one aspect, the first handle 28 has a single connection point to the frame 10, and specifically can be connected to the front frame 20. Due to its single connection point to the frame 10, the first handle 28 is primarily configured as a pull handle, however one of ordinary skill in the art would understand that the first handle 28 can be used in a pushing state. In another aspect, the first handle 28 can have more than one connection point with the frame 10. One of ordinary skill in the art would understand that the first handle 28 could be connected to various other portions of the frame 10 besides the front frame 20. Additional details regarding the first handle 28 are provided herein.

Figure 2:
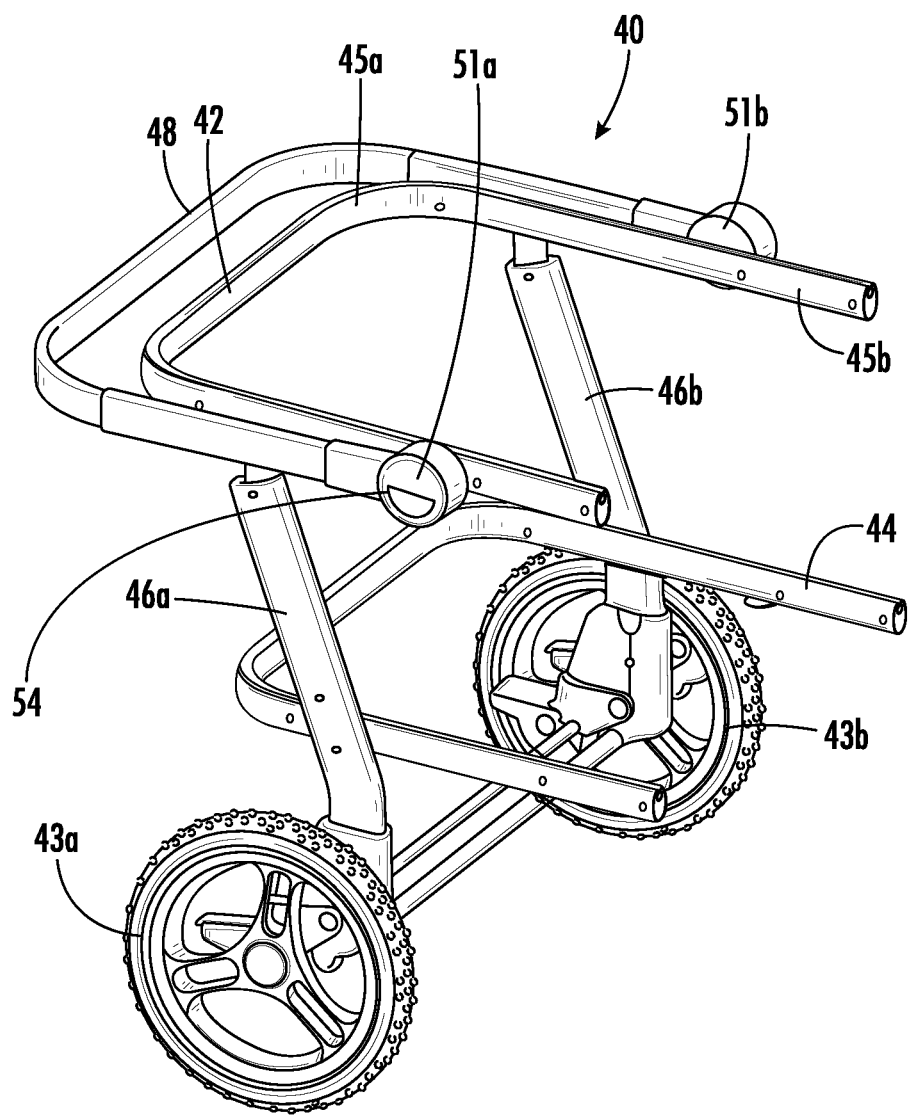
FIG. 2 is a perspective view of a rear frame portion of the stroller wagon frame according to one example.

As shown in FIGS. 2 and 4, the rear frame 40 can include a rear top rail tube 42, a rear bottom rail tube 44, and rear leg tubes or supports 46a, 46b. In one aspect, the rear top rail tube 42 has a U-shaped profile. In one aspect, the rear bottom rail tube 44 has a U-shaped profile. One of ordinary skill in the art would understand that the exact shape of the rear top rail tube 42 and the rear bottom rail tube 44 can vary. In certain aspects, the rear frame 40 can consist of a plurality of tubes connected at right angles or other angles. The rear frame 40 could alternatively include a series of linkages, plates, rods, tubes, or other structures that are connected to each other in an intersecting manner, similar to a scissor lift support frame, such that the rear frame 40 can be folded. In one aspect, a bottom portion of the rear frame 40 can include at least one rigid support surface. The bottom portion may include a solid support surface. In another aspect, a grid or lattice type support surface can be provided by the bottom portion of the rear frame 40. One of ordinary skill in the art would understand that any side portion or bottom portion of the rear frame 40 can include a rigid surface.

As shown in FIG. 4, the rear leg tubes 46a, 46b can connect the rear top rail tube 42 and the rear bottom rail tube 44 through pivot connections 49a, 49b, 49c, 49d. Terminal ends of the rear leg tubes 46a, 46b can connect to the rear wheel assemblies 43a, 43b. One of ordinary skill in the art would understand that alternative configurations could be used to connect the upper and lower ends of the rear frame 40 besides the rear leg tubes 46a, 46b. Additionally, the rear wheel assemblies 43a, 43b could be connected directly to another portion of the frame 10.

A second handle 48 is provided that is generally connected to at least one portion of the frame 10, as shown by at least FIGS. 2, 5C, 5D, 6A, and 6B. In one aspect, the second handle 48 is a push handle or a rear handle. One skilled in the art would understand that the second handle 48 could be used as either a push or a pull handle, depending on the direction of travel of the user. In one aspect, the second handle 48 is connected to a portion of the rear frame 40. Alternatively, the second handle 48 could be connected to a portion of the front frame 20, a portion of the center hinge 60, 60a, 60b or any other portion of the frame 10. Additional details regarding the second handle 48 are provided herein.

Figure 3A:
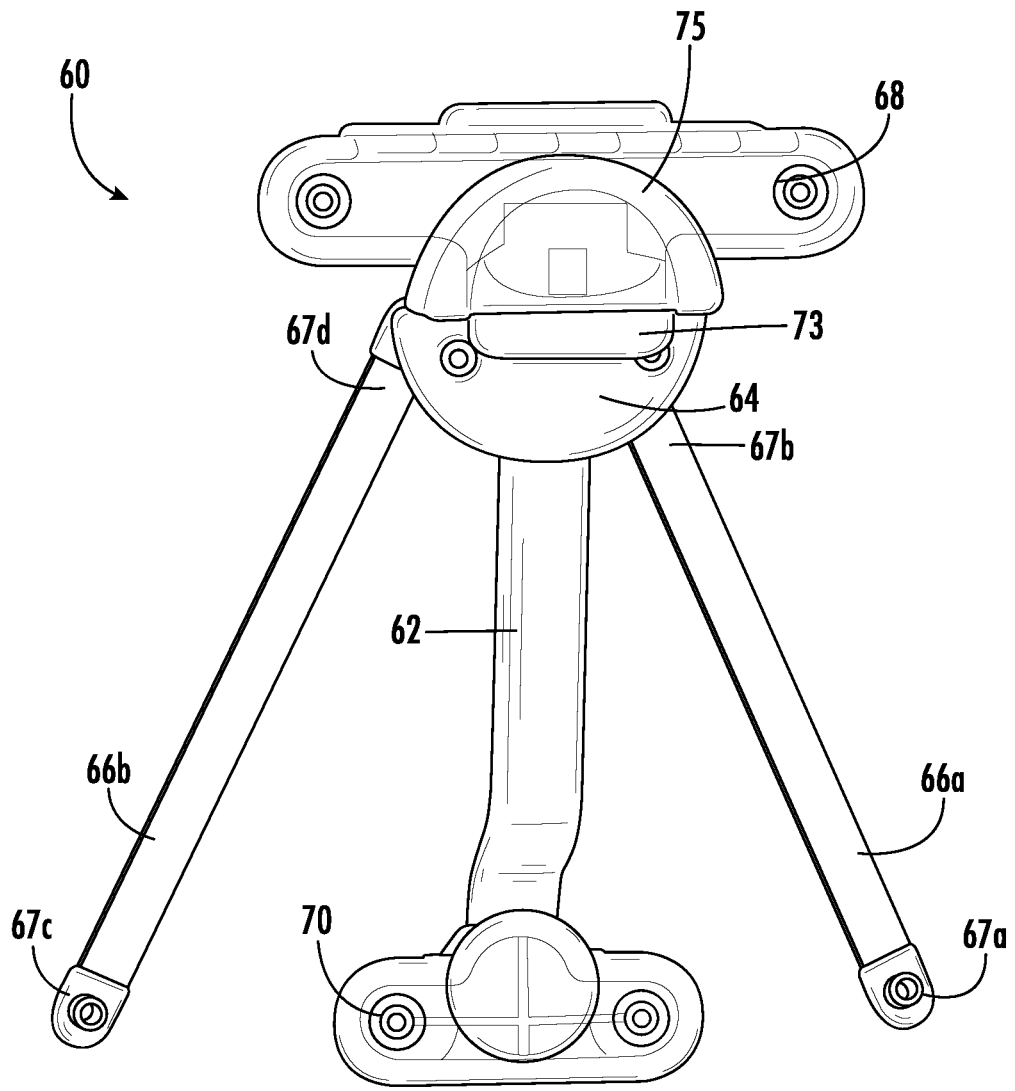
FIG. 3A is a front view of a center hinge assembly for use with a stroller wagon frame according to one example.
Figure 3C:
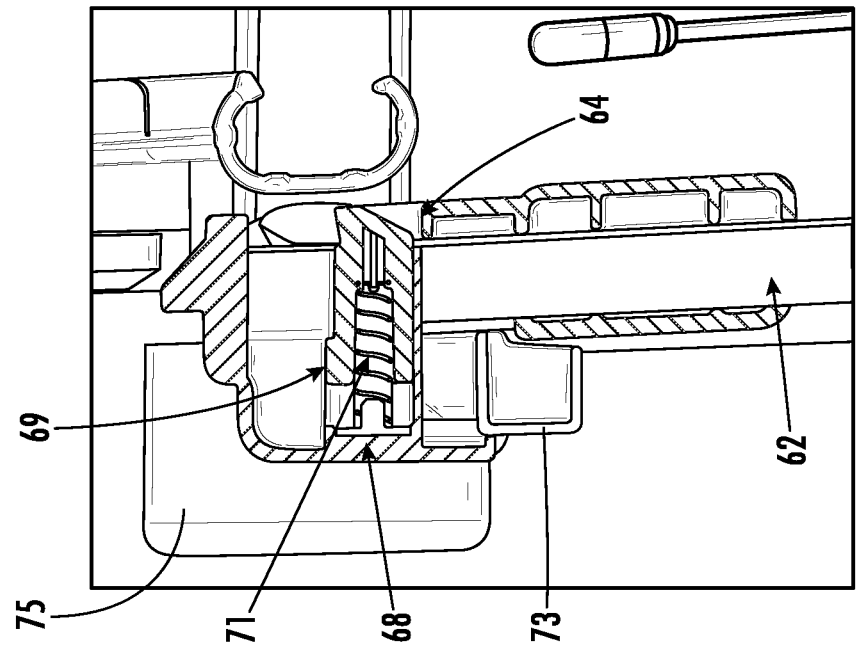
FIG. 3C is a cross-sectional view along line 3C-3C from FIG. 3B.
Figure 3B:
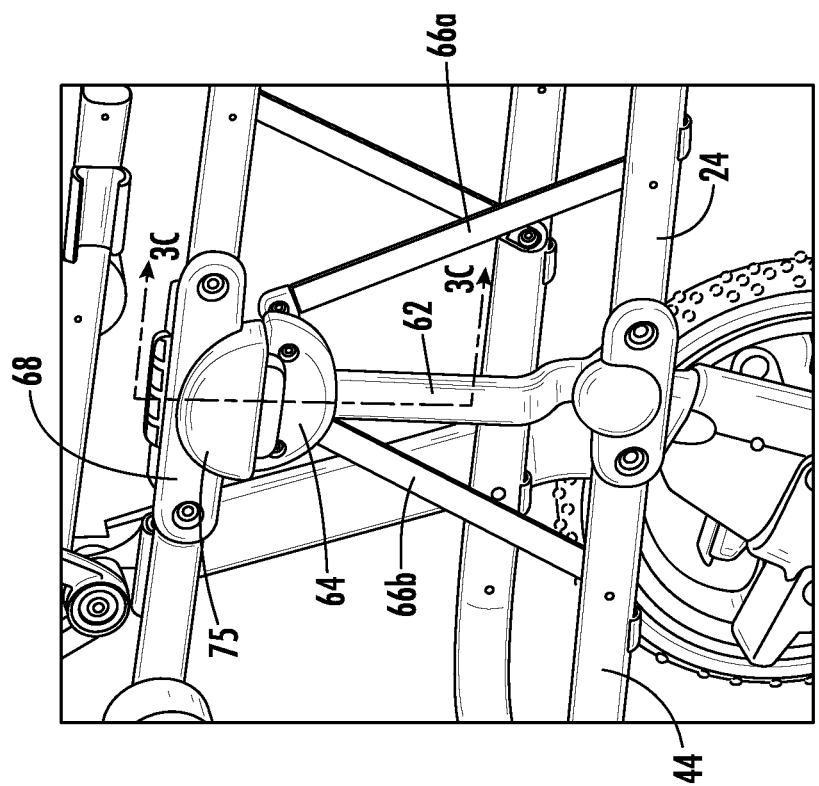
FIG. 3B is a magnified perspective view of the center hinge assembly according to one example.
Figure 3D:
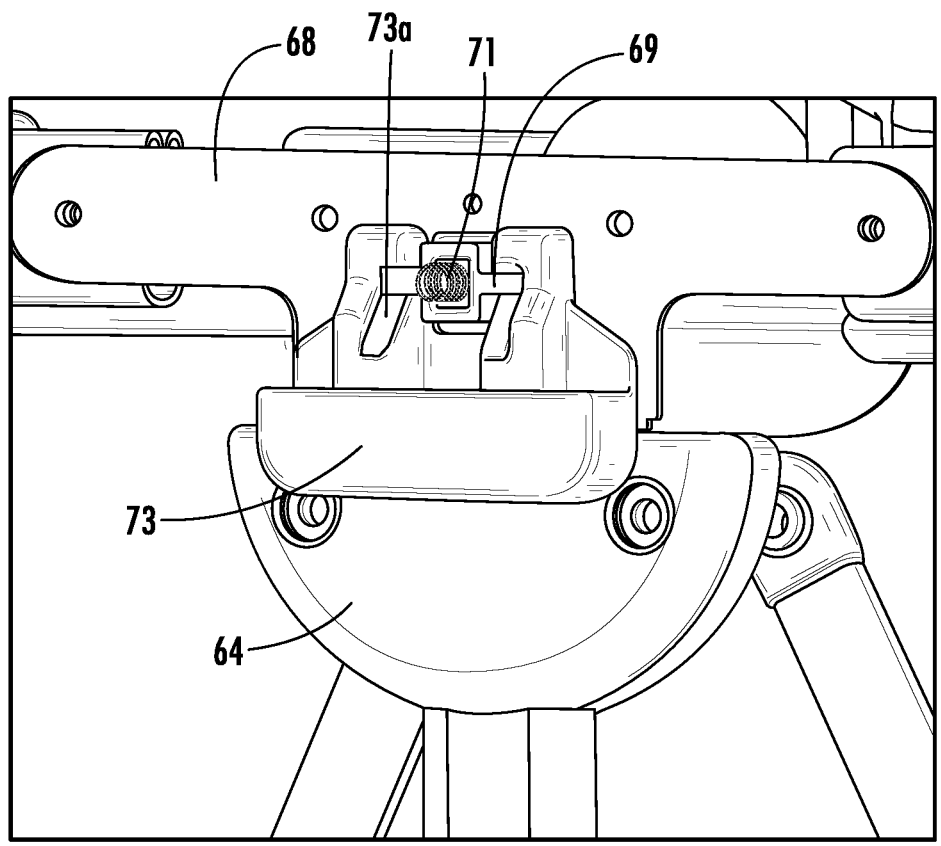
FIG. 3D is a magnified perspective view of the center hinge assembly according to one example.

The center hinge 60, 60a, 60b generally provides a folding feature for the frame 10. One of ordinary skill in the art would understand that the center hinge 60, 60a, 60b could be implemented in a variety of ways, and does not necessarily require the features shown in the Figures. In one aspect, the center hinge 60, 60a, 60b provides a central pivot about which two halves of the frame 10 can be folded. In one aspect, the two halves are the front and rear frames 20, 40 (i.e. the first end and second end of the frame 10). In another aspect, the frame 10 may be configured to be folded such that the right and left sides of the frame 10 are folded towards each other. As shown in at least FIGS. 3A, 3B, 3C, 3D, and 5B, the center hinge 60, 60a, 60b can include a vertical hinge tube 62, a center hinge slider 64, center hinge linkages 66a, 66b, a top center hinge plate 68, and a bottom center hinge plate 70. An outer cover 75 can also be provided for the top center hinge plate 68, as shown in FIGS. 3A, 3B, and 3C. FIG. 3D provides a view of the center hinge 60, 60a, 60b with the outer cover 75 removed. The center hinge 60, 60a, 60b can generally connect the front frame 20 and the rear frame 40 with each other. More specifically, in one aspect, proximal ends 25b of the front frame 20 and proximal ends 45b of the rear frame 40 are connected to the center hinges 60, 60a, 60b. As used in this respect, the term proximal means longitudinally inward and towards a center or medial region 12 of the stroller wagon frame 10.

The term terminal as used herein refers to a direction longitudinally away from the center or medial region 12 of the stroller wagon frame 10. Two portions of the frame 10, such as the front top rail tube 22 and the rear top rail tube 42, can pivotally connect to the top center hinge plate 68, and two different portions of the frame 10, such as the front bottom rail tube 24 and rear bottom rail tube 44, can pivotally connect to the bottom center hinge plate 70.

Figure 10B:
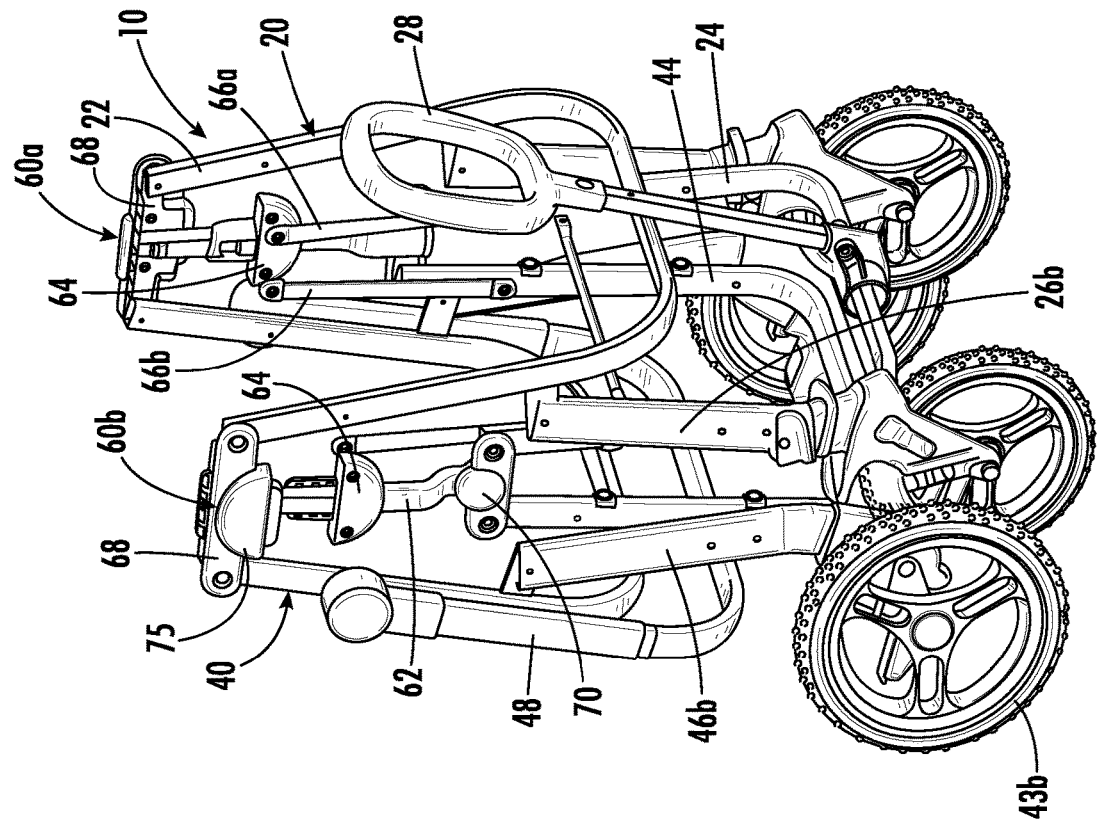
FIG. 10B is a perspective view of the stroller wagon frame in the folded configuration according to one example.
Figure 10A:
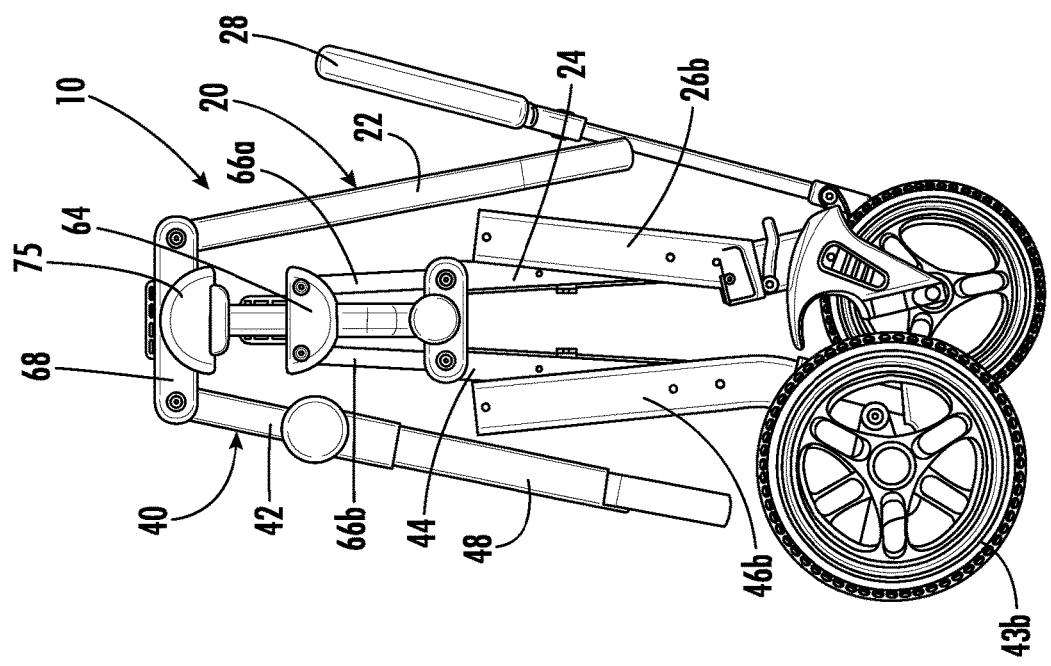
FIG. 10A is a side view of the stroller wagon frame in a folded configuration according to one example.

The center hinge linkages 66a, 66b can also connect to the front and rear frames 20, 40. As shown in FIGS. 3A and 3B, a first and second center hinge linkage 66a, 66b are provided. One end 67a of the first center hinge linkage 66a can be pivotally connected to the front bottom rail tube 24 and the other end 67b can be pivotally connected to the center hinge slider 64. The second center hinge linkage 66b similarly can connect to the rear bottom rail tube 44 and the center hinge slider 64 with pivoting connections. As shown in FIGS. 3A and 5B, a first end 67c of the second center hinge linkage 66b can be configured to attach to the rear bottom rail tube 44, and a second end 67d of the second center hinge linkage 66b can be connected to the center hinge slider 64. The center frame slider 64 can be slidably attached to the vertical hinge tube 62. The center hinges 60, 60a, 60b can be configured to allow the front frame 20 and the rear frame 40 to fold or pivot towards each other such that the stroller wagon frame 10 can be folded, as shown in FIGS. 10A and 10B. In one aspect, folding of the stroller wagon frame 10 requires upward pulling on the center hinges 60, 60a, 60b. Other ways or configurations for folding the stroller wagon frame 10 can be used, as one of ordinary skill in the art would appreciate based on this disclosure.

As shown in FIGS. 3C and 3D, a latch 69 can be provided between the top center hinge plate 68 and the center hinge slider 64. A folding button 73 can be provided that is configured to be selectively engaged by a user such that the latch 69 is selectively disengaged, and the center hinge slider 64 can move downward from the top center hinge plate 68. In one example, the latch 69 can be configured to be displaced via a ramped surface 73a when the folding button 73 is engaged, pressed, or pulled. The latch 69 can include a corresponding ramped surface that mates with the ramped surface 73a, in one aspect. A spring 71 can be provided that generally biases the latch 69 to an engaged position (i.e. setup position) such that the top center hinge plate 68 and the center hinge slider 64 are connected with each other. The spring 71 can also be configured to bias the folding button 73 to its disengaged position. In one aspect, as the folding button 73 is vertically engaged or pulled, the latch 69 is horizontally displaced due to the ramped surfaces, and the latch 69 becomes disengaged. In another aspect, the folding button 73 could be configured to be pushed in a horizontal direction, and the latch 69 could also be configured to become disengaged. One of ordinary skill in the art would recognize from this disclosure that various types of buttons, actuators, handles, latches, retainers, or other structures may be provided to generally attach and detach the center hinge slider 64 from the top center hinge plate 68. Once the latch 69 becomes disengaged, the frame 10 can be lifted via the top center hinge plate 68 and the front and rear frames 20, 40 rotate downward. As the front and rear frames 20, 40 rotate downwards, the center frame slider 64 is driven downward along the vertical hinge tube 62 due to the linkages 66a, 66b. Any variety of folding configurations and actuation features could be used to effectuate the folding aspect of the frame 10. Differing folding mechanisms may include more or less features as shown in the Figures and described herein.

Figure 6B:
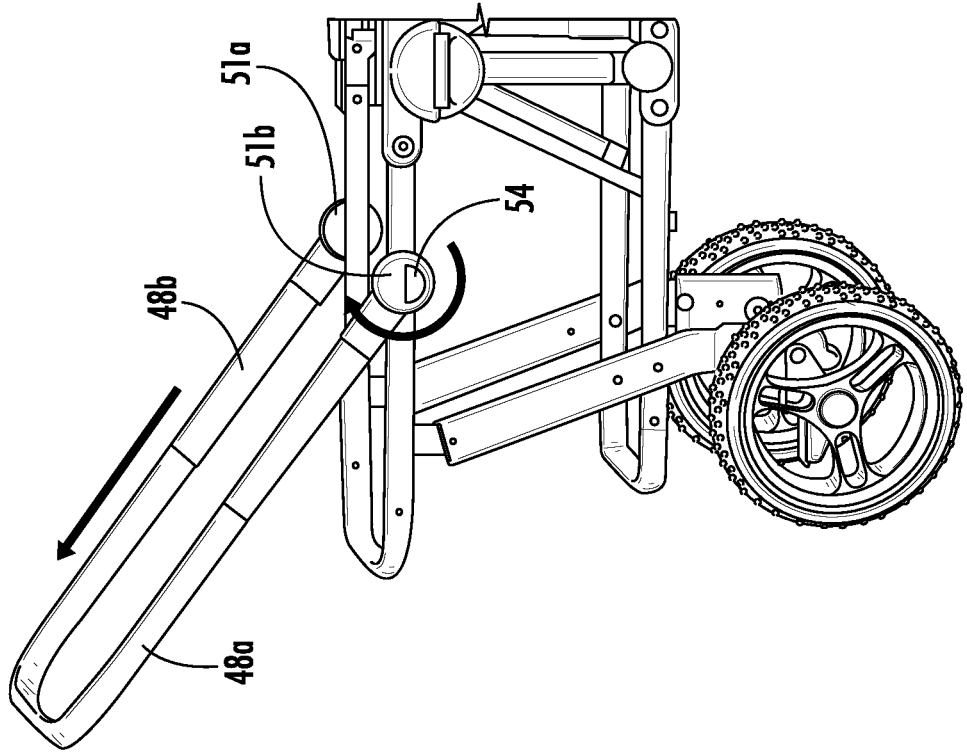
FIGS. 6A and 6B illustrate perspective views of the rear frame portion with a push handle in two different positions and configurations.
Figure 6A:
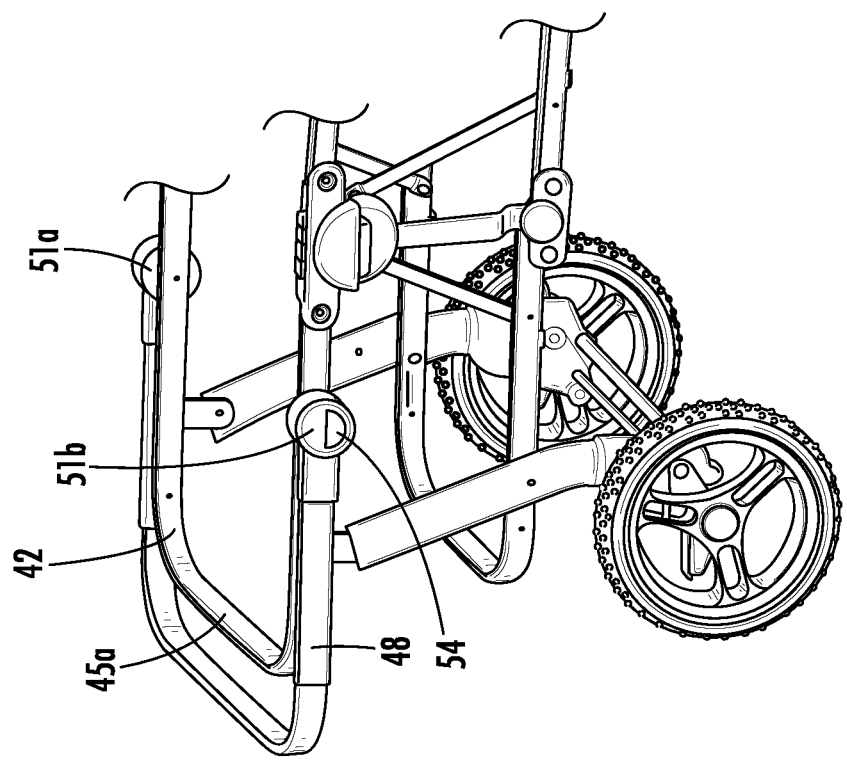

More details regarding the push handle 48 and the rear frame 40 are shown in FIG. 6A (push handle 48 in a lower, stowed position, or stored position) and FIG. 6B (push handle 48 in an angled, upward, deployed position, or use position). FIG. 6A illustrates the push handle 48 in a non-extended or compressed state, while FIG. 6B illustrates the push handle 48 in an extended or telescoping state. Although only two states or positions are shown in FIGS. 6A and 6B, one of ordinary skill in the art would understand that the push handle 48 can be completely adjustable, such that it can be raised or lowered to numerous positions, and the telescoping function can allow the push handle 48 to be lengthened or shortened to a variety of lengths.

The push handle 48 can be pivotally connected to the frame 10 via a pair of pivoting connections 51a, 51b, or any other type of connection. In one aspect, the push handle 48 can have a U-shaped profile. In the stowed position, the push handle 48 can either nest inside of at least one portion of the frame 10, or nest around at least one portion of the frame 10. As used in this context, the term nest means one component surrounding the other component for a certain extent. In one aspect, the component can surround a majority of a periphery or perimeter of another component. The term nest can refer to surrounding a lateral inner side or lateral outer side of another component. In a deployed position, the handle 48 extends upwards, preferably at an angle, from the frame 10. Alternative configurations for the push handle 48 can be provided as one of ordinary skill in the art would appreciate that may or may not have a nesting ability.

In one aspect, the push handle 48 is connected to the frame 10 via pivoting connections 51a, 51b positioned on the rear top rail tube 42. In one configuration, the pivoting connections 51a, 51b can be located along the rear top rail tube 42 so that the push handle 48 can fold down and in line (i.e. parallel) with the rear top rail tube 42 when not in use. The pivoting connections 51a, 51b can be spaced from each other in the lateral direction. In one configuration, a first one of the pivoting connections 51a is provided on a first lateral side of the stroller wagon frame 10, and a second one of the pivoting connections 51b is provided on a second lateral side of the stroller wagon frame 10. In some configurations, the pivoting connections 51a, 51b are provided on the rear bottom rail tube 44. In another configuration, the pivoting connections 51a, 51b are provided on portions of the stroller wagon frame 10 between the rear top rail tube 42 and the rear bottom rail tube 44. In one aspect, the pivot connections 51a, 51b can be provided at the center hinges 60, 60a, 60b. In another aspect, the pivot connections 51a, 51b can be provided at the rear leg tubes 46a, 46b. The pivoting connections 51a, 51b could alternatively be provided on any of the analogous areas of the front frame 20, such as the front top rail tube 22, the front bottom rail tube 24, the front leg tubes 26a, 26b, etc. In some configurations, the pivoting connections 51a, 51b may be attached or arranged adjacent to portions of at least one of the wheel assemblies 23a, 23b, 43a, 43b.

The push handle 48 can generally be configured to nest with at least one portion of the stroller wagon frame 10 in the stowed state. In one aspect, the push handle 48 can be configured to nest with at least one longitudinal end of the stroller wagon frame 10. For example, the push handle 48 can be configured to nest within or around at least one longitudinal end of the stroller wagon frame 10, such as the rear frame 40.

Figure 5C:
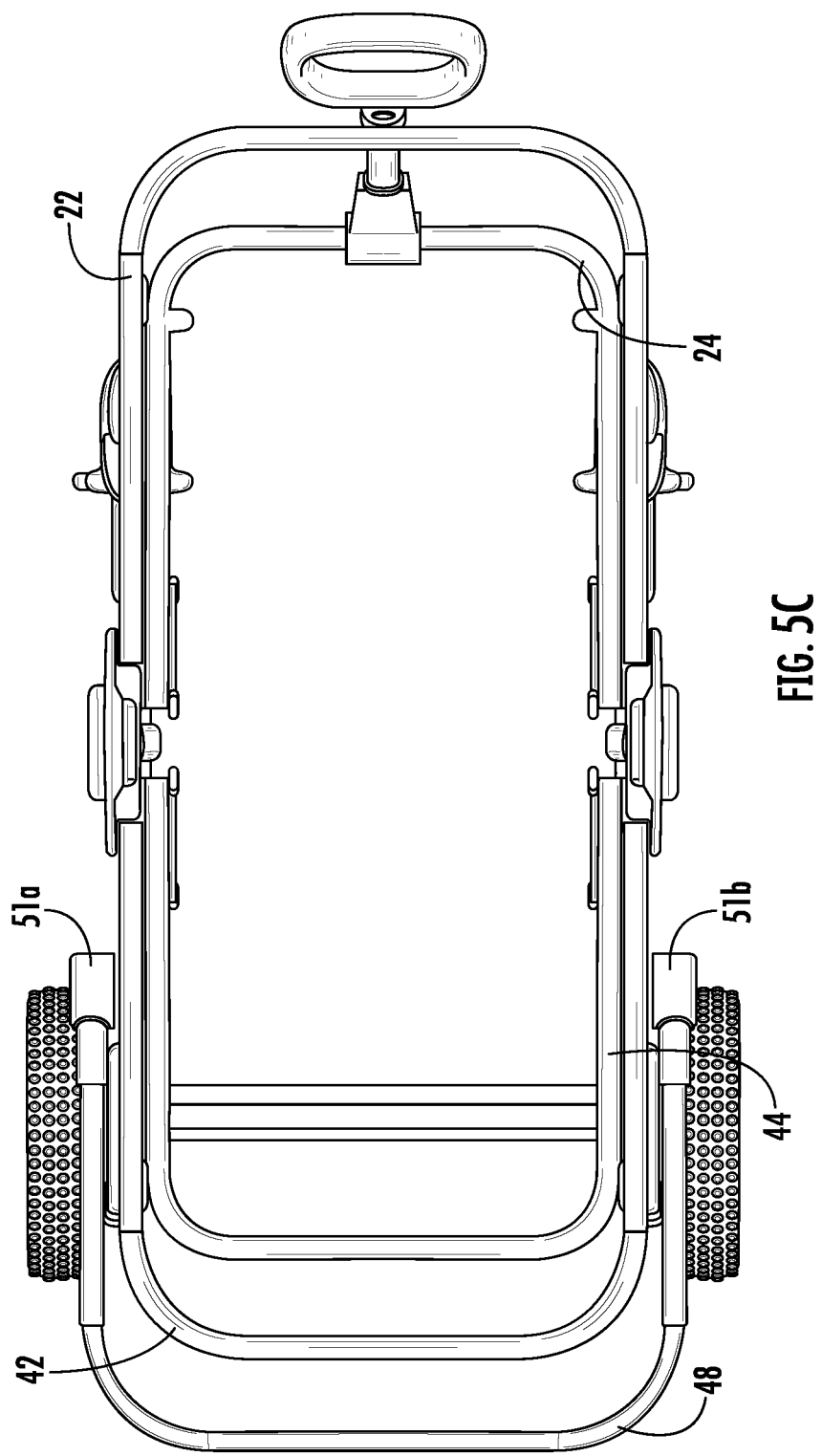
FIG. 5C is a top view of the stroller wagon frame according to one example.
Figure 6C:
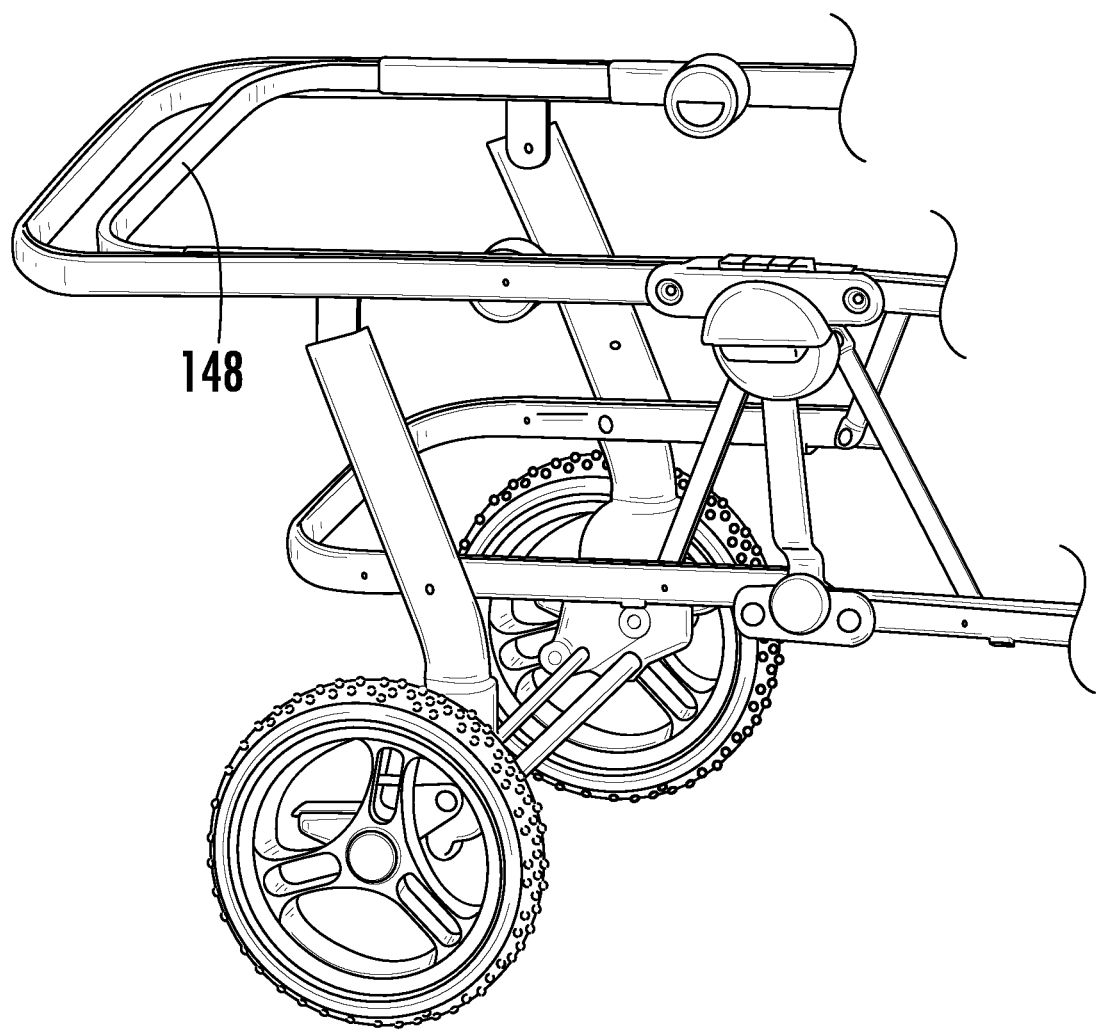
FIG. 6C illustrates a perspective view of the push handle nested inside at least one portion of the frame.

In one aspect, the push handle 48 can nest with the rear top rail tube 42. In one example, the push handle 48 nests around the rear top rail tube 42. The push handle 48 can be configured to pivot to a lower position in which the push handle 48 surrounds a periphery or outer perimeter of at least one portion of the frame 10, such as the rear top rail tube 42, which is shown in FIG. 5C. Based on the present disclosure, one of ordinary skill in the art would recognize that the push handle 148 could be smaller than the frame of the rear top rail tube 42 such that the push handle 148 nests inside of the rear top rail tube 42, or any other portion of the frame 10, as shown in FIG. 6C.

As shown in FIGS. 4, 5A, 6A, and 6B, the pivoting connections 51a, 51b can be arranged longitudinally inward from a terminal portion 45a of the rear top rail tube 42. In one aspect, the pivoting connections 51a, 51b can be located longitudinally inward towards the medial region 12 of the stroller wagon frame 10 relative to pivoting connections 49a, 49b. In one aspect, the pivoting connections 51a, 51b can be located between the pivoting connections 49a, 49b and proximal ends 45b of the rear top rail tube 42 that are connected to the center hinge 60. In one aspect, the push handle 48 can be configured to be parallel or substantially parallel with the rear top rail tube 42 in a stowed state or lower position. In one aspect, the stowed state corresponds to a lower or lowermost position of the push handle 48. The push handle 48 can be configured to be angled relative to a portion of the stroller wagon frame 10 in a use state or deployed state. In one aspect, the push handle 48 can be configured to be angled relative to the rear top rail tube 42 in the deployed state. In one aspect, the push handle 48 is configured to project upward in the deployed position from a single portion of the frame, and the push handle 48 is configured to nest relative to the same single portion of the frame in the stowed state.

Figure 5D:
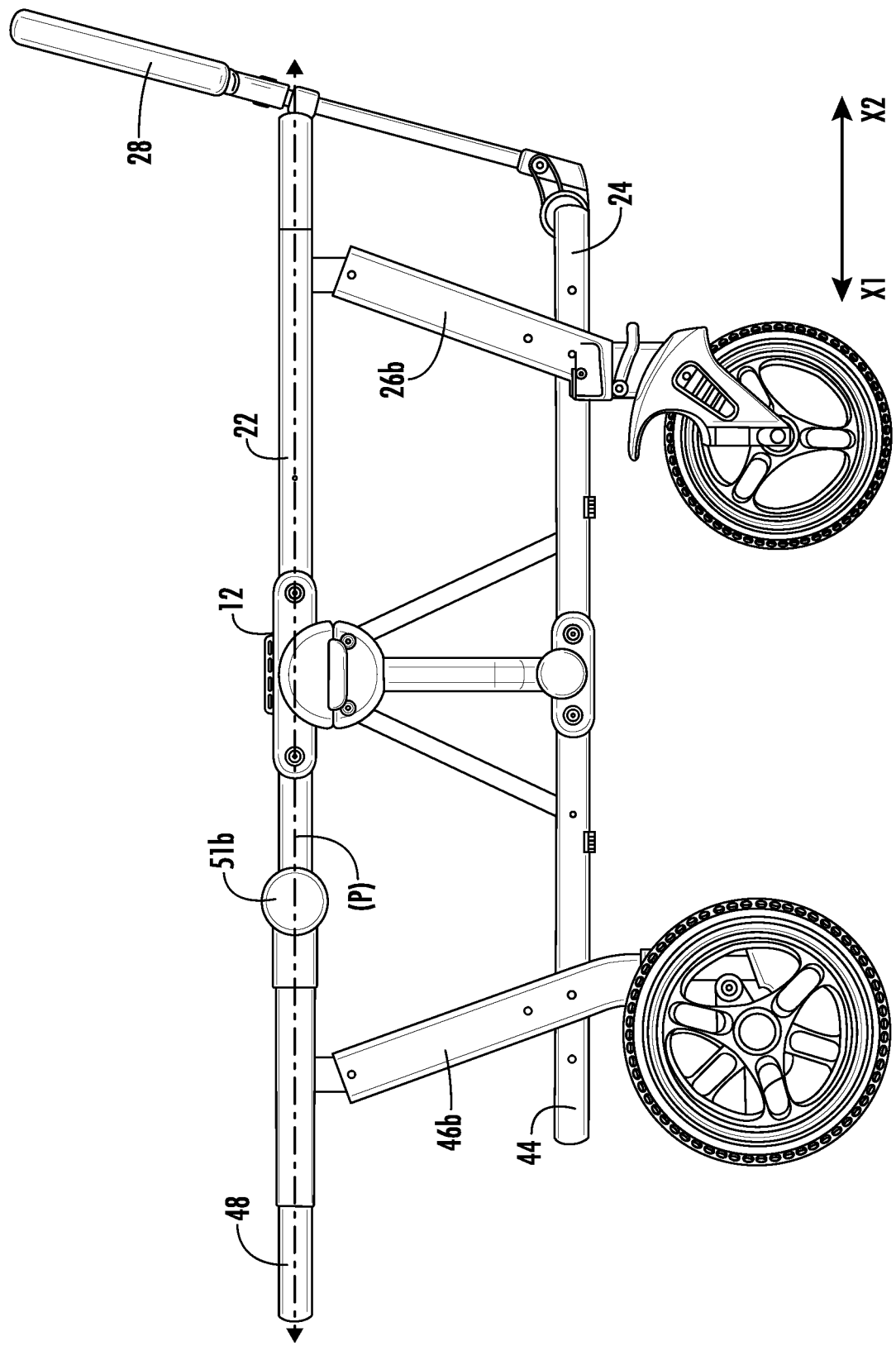
FIG. 5D is a side view of the stroller wagon frame according to one example.

The pivoting connections 51a, 51b can also arranged longitudinally inward towards the medial region 12 of the stroller wagon frame 10 relative to the at least one rear wheel assembly 43a, 43b, as best shown in FIG. 5D. One of ordinary skill in the art would understand that the pivoting connections 51a, 51b may alternatively be arranged at the medial region 12 of the stroller wagon frame 10, the terminal portion 45a of the rear top rail tube 42, or any position therebetween.

As shown in FIGS. 6A and 6B, the push handle 48 can include a telescoping feature such that a first section 48a (i.e. telescoping portion) of the push handle 48 is extendable relative to a second or base section 48b of the push handle 48. The telescoping portion 48a can be extended to provide the caregiver or user adequate clearance for walking while pushing the wagon. The push handle 48 can therefore be shortened or lengthened depending on how the telescoping feature is used. In one aspect, the push handle 48 can have a fixed length. In another aspect, the push handle 48 can be lengthened or shortened based on another feature other than a telescoping configuration.

Since the push handle 48 can be pivotally connected to the rear top rail tube 42 and can have a telescoping feature, the push handle 48 is able to fold in line with a portion of the frame 10, such as the rear top rail tube 42, and can be compressed or slid into the non-telescoping position such that the push handle 48 is arranged closely around a portion of the frame 10, such as the rear top rail tube 42. This reduces unwanted bulk both when the push handle 48 is not in use and when the product is folded. In another configuration, this compact storage of the push handle 48 could also be achieved without the telescoping section 48a and instead using a second pivot on the push handle 48 so that it could be folded over itself to be in line with a portion of the frame 10, such as the rear top rail tube 42. As best shown in FIG. 5C, the push handle 48 can be laterally wider than the rear top rail tube 42, as well as any other portion of the frames 20, 40.

In one aspect, a locking assembly can be provided that includes a locking gear or mechanism to lock the handle 48 in a secure position. As shown by at least FIGS. 2, 5A, and 6A, an actuator 54, such as a push button or control, can be provided to actuate and release the locking gear or mechanism. The actuator 54 could alternately be provided on the handle 48 itself, or any other location.

In one aspect, the front top rail tube 22 and the rear top rail tube 42 are arranged in a single, common horizontal plane (P) that is parallel to the ground surface. The horizontal plane (P), as shown in FIG. 5D, preferably extends through the push handle 48 when the push handle 48 is arranged in the lower, stowed position (i.e. the position shown in FIG. 6A). The horizontal plane (P) also preferably extends through the center hinges 60, 60a, 60b when the stroller wagon frame 10 is in the use or non-folded position. By having a continuous upper surface that is uninterrupted between terminal ends (i.e. longitudinally outward ends) of the front and rear top rail tubes 22, 42, the stroller wagon frame 10 provides more surface area for attaching secondary components, such as cup holder trays, soft goods wire frames, etc. The overall height of the stroller wagon frame 10 is also reduced as compared to other stroller wagon frames that include vertically extending supports which are exclusively provided for defining attachment points of push handles or pull handles.

In one aspect, as shown in FIG. 5C, a perimeter of the front top rail tube 22 and the rear top rail tube 42, including the connections provided by the center hinges 60, 60a, 60b, can be larger than a perimeter of the front bottom rail tube 24 and the rear bottom rail tube 44, including the connections provided by the center hinges 60, 60a, 60b. As a result, the stroller wagon frame 10 can have a profile that tapers inward from the top rail tubes 22, 42 to the bottom rail tubes 24, 44. In another aspect, a perimeter defined by the front top rail tube 22 and the rear top rail tube 42, including the connections provided by the center hinges 60, 60a, 60b can have the same size or a smaller size perimeter than the perimeter defined by the front bottom rail tube 24 and the rear bottom rail tube 44, including the connections provided by the center hinges 60, 60a, 60b.

As shown in FIGS. 7A and 7B, the pull handle 28 is preferably pivotally connected to the front bottom rail tube 24. The pull handle 28 could be formed on any other portion of the frame 10. In one aspect, the pull handle 28 includes a telescoping section 28a which allows the pull handle 28 to extend and give the user or caregiver additional clearance space for walking. A retention clip 29 can be provided on the frame 10. The retention clip 29 can be provided on the front top rail tube 22, which is an uppermost portion of the stroller wagon frame 10, in one aspect. This allows a user to more easily clip the pull handle 28 onto the retention clip 29 without bending or reaching down. More specifically, the retention clip 29 can be formed on a terminal end 25a of the front top rail tube 22.

The pull handle 28 is configured to be clipped into the retention clip 29 such that the pull handle 28 can be stored in a generally vertical position. As shown in FIG. 5D, the handle 28 can be stored at an angled position that conforms to the taper between the top rail tubes 22, 42 and the bottom rail tubes 24, 44. The retention clip 29 can be formed from plastic which can elastically deform when the pull handle 28 is pushed into engagement with the retention clip 29. In another configuration, an attachment strap and snapping button can be provided to secure the pull handle 28. One of ordinary skill in the art would understand that various types of retention features could be implemented to secure the pull handle 28.

The front leg tubes 26a, 26b, with reference to a direction going from the front top rail tube 22 to the front bottom rail tube 24, can be oriented in an angled configuration that is angled towards the longitudinally medial region 12 of the stroller wagon frame 10 (i.e. from the X2 direction to the X1 direction in FIGS. 5A and 5D). The rear leg tubes 46a, 46b, with reference to a direction going from the rear top rail tube 42 to the rear bottom rail tube 44, can also be oriented in an angled configuration that is angled towards the longitudinally medial region 12 of the stroller wagon frame 10 (i.e. from the X1 direction to the X2 direction in FIGS. 5A and 5D). In one aspect, the front and rear leg tubes 26a, 26b, 46a, 46b are angled longitudinally towards each other in a direction of a ground support surface, which is shown in FIG. 5D. This arrangement reduces the overall size of the stroller wagon frame 10. In the use or unfolded position, the front and rear wheel assemblies 23a, 23b, 43a, 43b are each positioned longitudinally inward relative to an outer perimeter defined by the stroller wagon frame 10. One of ordinary skill in the art would recognize based on the present disclosure that the front and rear leg tubes 26a, 26b, 46a, 46b alternatively can extend in a straight manner (i.e. perpendicular to the ground surface) or could be angled in the opposite directions as shown in the Figures.

As shown in FIGS. 8A, 8B, 8C, and 8D, both the front top rail tube 22 and the rear top rail tube 42 can be formed as a hollow tube 22a, 42a including channels 22b, 42b integrated into the tubing profile. In one embodiment, these channels 22b, 42b are formed as a part of the tube's extruded profile. One of ordinary skill in the art would understand that other methods, such as machining or cutting a groove in the tube, could be used to form the channels 22b, 42b. Additionally, one of ordinary skill in the art would recognize that any other portions of the frame 10 could be formed as hollow tubes including channels.

Figure 9A:
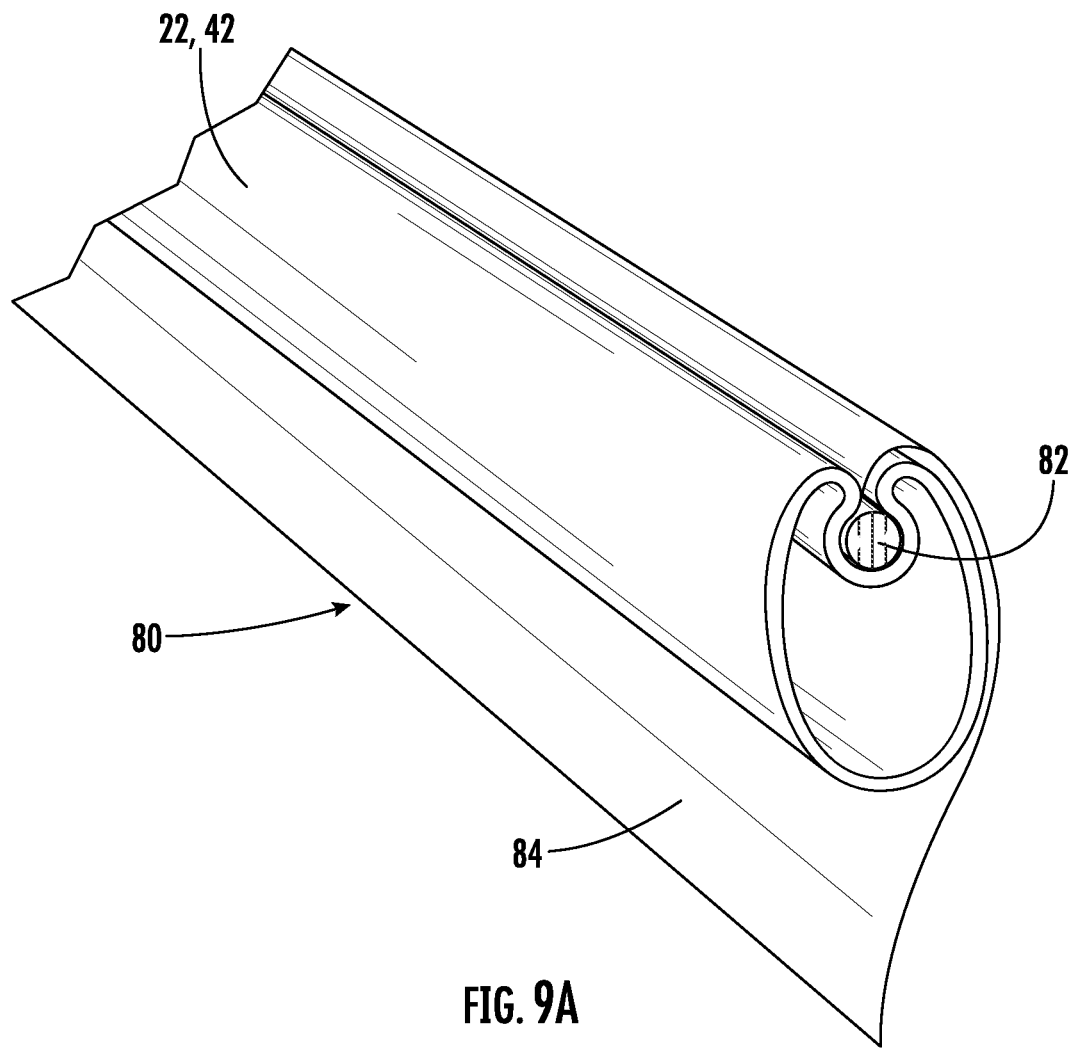
FIG. 9A is a perspective view of a soft goods assembly attached to a tube according to one example.
Figure 9B:
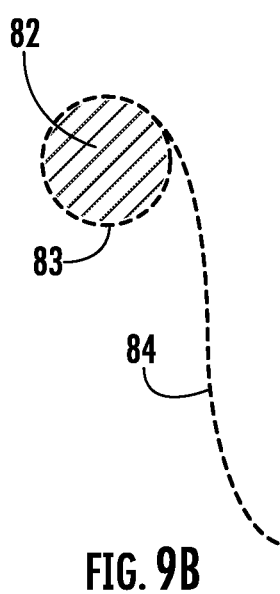
FIG. 9B is a magnified cross-sectional view of a portion of the soft goods assembly according to one example.

As shown in FIGS. 8B and 8D, slots 22c, 42c are integrally formed with at least one portion of the frame 10. In another aspect, the slots 22c, 42c are not formed integrally with the frame 10. One of ordinary skill in the art would understand that any type of slot, retainer, receptacle, pocket, or other element may be provided on the frame 10 that is configured to retain a portion of a soft goods assembly 80. In one aspect, the slots 22c, 42c are formed with the tubes 22, 42. In one aspect, the slots 22c, 42c are dimensioned to receive a portion of the soft goods assembly 80. As shown in FIGS. 9A and 9B, the soft goods assembly 80 includes a stiffener 82 and a soft goods enclosure 84. The soft goods enclosure 84, once attached to the frame 10, generally defines a support area configured to support a child, children, and/or personal items that are being transported by the stroller wagon frame 10.

In one aspect, the stiffener 82 can be formed as an elongated rod. One of ordinary skill in the art would understand that other types of stiffener elements could be used that provide a rigid support element for engaging with the slots 22c, 42c. In one aspect, the stiffener 82 is configured to slide into a receptacle 83 of the soft goods enclosure 84. In one aspect, the receptacle 83 is sewn directly into a free end of the soft goods enclosure 84 such that it defines a pocket or tunnel for the stiffener 82. Other forms of attachment of the stiffener 82 to the soft goods enclosure 84 can be used. FIG. 9B illustrates the soft goods enclosure 84 and the receptacle 83 in dashed lines for illustrative purposes to show the engagement with the stiffener 82. One of ordinary skill in the art would understand based on this disclosure that alternative configurations may be used to fix the soft goods assembly 80 to the frame 10 that may or may not require a stiffener element.

As shown in FIG. 9A, the stiffener 82, which is secured within the receptacle 83, is configured to be fed through the slots 22c, 42c in the top rail tubes 22, 42. In one aspect, the stiffener 82 is larger than a narrowest portion of the slots 22c, 42c, such that the soft goods enclosure 84 can be drawn tight without becoming detached from the tubes 22, 42. The slots 22c, 42c can include a first area dimensioned for receiving the stiffener 82, and a second area that is narrower than the first area that is arranged directly above the first area. The first and second areas of the slots 22c, 42c are connected to each other. The narrower second area ensures that the stiffener 82 is retained within the larger first area of the slots 22c, 42c.

In one aspect, the top rail tubes 22, 42 each extend continuously around outer perimeter corners of the stroller wagon frame 10, which allows for the slots 22c, 42c to also extend continuously along the outer perimeter corners of the stroller wagon frame 10. In one aspect, the slots 22c, 42c have a continuous U-shaped profile that matches a U-shaped profile of the top rail tubes 22, 42. This configuration provides an improved attachment configuration for the soft goods assembly 80 relative to the stroller wagon frame 10 as compared to existing stroller wagon frames which do not have a continuously defined slot around the corners of the frame. In one aspect, the slots 22c, 42c are continuous and uninterrupted in areas of the frame 10 between the center hinges 60, 60a, 60b. In one aspect, the slots 22c, 42c extend for an entire perimeter along the upper end of the frame 10.

As shown in at least FIG. 4, the pivot connections 29a, 29b, 49a, 49b for the vertical supports (i.e. front and rear leg tubes 26a, 26b, 46a, 46b) can be provided on an underside of an upper end of the frame 10, such as the top rail tubes 22, 42. Based on this configuration, the pivot connections 29a, 29b, 49a, 49b do not interfere with the soft goods assembly 80 or its attachment to the frame 10. An unobstructed interior receiving area, which is configured to receive the soft goods assembly 80, is therefore defined by the frame 10.

By attaching the soft goods in this manner, both the front top rail tube 22 and the rear top rail tube 42 are exposed on the outside or exterior of the stroller wagon, and the soft goods enclosure 84 covers the tubes 22, 42 on an interior side (i.e. the occupant area as shown on the right side of FIG. 9A). In one aspect, a top surface and/or exterior surface of the top end of the frame 10 (i.e. tubes 22, 42) remains exposed when the soft goods assembly 80 is attached to the frame 10. The term exterior, as used in this instance, refers to a direction facing outward from the interior receiving area of the frame 10. This configuration provides a more streamlined, sleek, and modern appearance as compared to other attachment means for securing soft goods to stroller wagon frames. One of ordinary skill in the art would recognize that the soft goods enclosure 84 could alternatively be configured to cover the exterior surface of the stroller wagon. As shown in FIG. 9A, at least a portion of a top surface of the frame 10, which may include the top rail tubes 22, 42 or any other region of an upper end of the frame 10, is exposed when the stiffener 82 is arranged in the slots 22c, 42c, and the soft goods enclosure 84 hangs downward into an interior receiving area of the frame 10.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

The invention claimed is:

1. A wagon assembly comprising:
   a frame having:
      a first end and a second end that are spaced from one another along a longitudinal direction;
      a first side and a second side that are spaced from one another along a lateral direction; and
      an upper end and a lower end that are spaced from one another along a vertical direction, the upper end defining at least one slot configured to receive a stiffener of a soft goods assembly; and;
      the frame defining an interior receiving area therein; and
   a handle pivotally attached to the frame at a pair of pivot connections that are spaced from one another with respect to the lateral direction, the handle being configured to pivot between:
      a stowed position in which the handle nests relative to at least one portion of the frame, and
      a deployed position in which the handle extends upwards from the frame.

2. The wagon assembly according to claim 1, wherein the pair of pivot connections are each positioned longitudinally inward from the first end of the frame and the second end of the frame.

3. The wagon assembly according to claim 1, wherein the handle nests around the first end of the frame in the stowed position, and the handle extends upwards from the first end of the frame in the deployed position.

4. The wagon assembly according to claim 1, wherein the handle nests inside the at least one portion of the frame in the stowed position.

5. The wagon assembly according to claim 1, wherein the handle has a U-shaped profile.

6. The wagon assembly according to claim 1, wherein a first pivot connection of the pair of pivot connections is positioned on the first side of the frame, and a second pivot connection of the pair of pivot connections is positioned on the second side of the frame.

7. The wagon assembly according to claim 1, wherein the frame further comprises a plurality of leg supports connecting the upper end of the frame to the lower end of the frame, the plurality of leg supports each connected to at least one wheel assembly.

8. The wagon assembly according to claim 1, wherein the at least one slot extends continuously around the perimeter of the upper end of the frame.

9. The wagon assembly according to claim 1, wherein the at least one slot is defined on an upper surface of the upper end of the frame, and the at least one slot extends continuously around outer perimeter corners of the upper end of the frame.

10. The wagon assembly according to claim 1, further comprising a soft goods assembly,
wherein at least an exterior surface of the upper end of the frame is exposed when the soft goods assembly is attached to the frame via engagement of the stiffener within the at least one slot, and a soft goods enclosure of the soft goods assembly hangs within the interior receiving area of the frame.

11. The wagon assembly according to claim 9, wherein the upper end of the frame includes a plurality of pivot connections arranged on an underside of the upper end of the frame, the plurality of pivot connections being configured to attach to a plurality of leg supports.

12. The wagon assembly according to claim 11, wherein the plurality of leg supports are each connected to the lower end of the frame, and each terminal end of the plurality of leg supports is connected to at least one wheel assembly.

13. The wagon assembly according to claim 1, further comprising at least one secondary handle connected to the second end of the frame.

14. The wagon assembly according to claim 13, further comprising a retention clip formed on the upper end of the frame and configured to hold the at least one secondary handle.

15. The wagon assembly according to claim 1, wherein a single, common horizontal plane (P) extends parallel to a ground support surface and also extends through the upper end of the frame and the handle when the handle is positioned in the stowed position.

16. The wagon assembly according to claim 1, wherein the handle is configured to be lengthened or shortened via a telescoping configuration.

17. The wagon assembly according to claim 1, wherein the wagon assembly is configured to be folded.

18. A wagon frame assembly comprising:
a frame including an upper end defining at least one slot, the frame defining an interior receiving area; and
a soft goods assembly including a stiffener dimensioned to be received within the at least one slot, and a soft goods enclosure attached to the stiffener,
wherein at least a portion of the upper end of the frame is exposed when the stiffener is secured within the at least one slot of the frame and the soft goods enclosure hangs within the interior receiving area of the frame.

19. The wagon frame assembly according to claim 18, wherein the at least one slot extends continuously around outer perimeter corners defined by the frame.

20. The wagon frame assembly according to claim 18, wherein an exterior surface of the upper end of the frame is exposed when the stiffener is secured within the at least one slot of the frame, and
the upper end of the frame includes a plurality of pivot connections arranged on an underside of the upper end and opposite from the at least one slot, the plurality of pivot connections each being configured to attach to a leg support.

* * * * *